(12) United States Patent
McGuire

(10) Patent No.: US 8,196,343 B1
(45) Date of Patent: Jun. 12, 2012

(54) CANDLESTICK WITH ANNULAR LIVE FLORAL HOLDER

(76) Inventor: Michael J. McGuire, Harrison City, PA (US)

( * ) Notice: Subject to any disclaimer, the term of this patent is extended or adjusted under 35 U.S.C. 154(b) by 354 days.

(21) Appl. No.: 12/383,680

(22) Filed: Mar. 27, 2009

(51) Int. Cl.
*A01G 5/00* (2006.01)
*A47G 7/00* (2006.01)
(52) U.S. Cl. .................... 47/41.13; 47/41.01
(58) Field of Classification Search ............. 47/41.13, 47/41.01, 41.12, 41.14, 41.15, 41.1, 41.11, 47/66.6; D11/143, 144; D26/10, 55; 428/23; 362/161
See application file for complete search history.

(56) References Cited

U.S. PATENT DOCUMENTS

| 1,631,631 A | | 2/1926 | Gerlinger | |
|---|---|---|---|---|
| 2,151,192 A | * | 3/1939 | Crosser | 431/295 |
| 2,686,989 A | | 7/1949 | Dillon et al. | |
| 2,876,587 A | | 10/1954 | Saks et al. | |
| 2,874,267 A | * | 2/1959 | Shipley | 362/101 |
| 2,929,171 A | | 3/1959 | Josephson | |
| 3,303,610 A | | 2/1967 | Erbguth | |
| 3,336,697 A | * | 8/1967 | Davis | 47/41.12 |
| 6,145,245 A | | 11/2000 | Honkawa et al. | |
| 2008/0057456 A1 | * | 3/2008 | Carroll | 431/253 |

* cited by examiner

*Primary Examiner* — Trinh Nguyen
(74) *Attorney, Agent, or Firm* — R. S. Lombard

(57) ABSTRACT

An annular live floral holder in combination with an elongated candlestick is provided. The candlestick in includes a base, an elongated support, a tubular candle holder and a flat-circular or dish-shaped member in coaxial alignment with the candle holder. The annular live floral holder is removably seated on the flat-circular of dish-shaped member. The floral holder has a central opening that permits a candle to pass through it. A circular water-retaining trough is formed on the floral holder. At least on water retaining foam member is arranged within the water retaining trough. Live cut floral members having stalks embedded in and supported by the at least one foam member. A foam member retaining apparatus is included for securing the at least one foam member within the water-retaining trough. Preferably, the floral holder also includes a wax dripping containment portion formed on the outside of the inner wall of the trough.

6 Claims, 4 Drawing Sheets

CANDLESTICK WITH ANNULAR LIVE FLORAL HOLDER

BACKGROUND OF THE INVENTION

The present invention relates to a live floral holder, and, in particular, to a candlestick with an annular live floral holder mounted thereon. In many churches, and other religious establishments, relatively tall candlesticks are often used near the front of the worship room or sanctuary. The candlesticks often include a flat circular or dish-shaped member proximate the candle holder portion of the candlestick. The flat circular or dish-shaped member in addition to being decorative serves to catch wax that may fall from the candle and may carry a removable floral holder. It is common for example in Catholic churches to mount a live floral holder containing live cut flowers on the flat circular or dish-shaped member. The live cut flowers carried by the floral holder add to the overall aesthetic appeal of the church environs and worship service. Typically, the live floral holder is nothing more than a plastic lid with the live cut flowers supported in floral foam that has been previously been wetted and attached to the lid by adhesive-backed floral tape, for example.

Over the years a number of patents have issued relating to various floral holders relating to candlesticks and the like. For example, a table decoration floral holder is disclosed in U.S. Pat. No. 1,631,631 issued Feb. 16, 1926 to Gertrude Gerlinger. The Gerlinger patent discloses a simple device that may be made of wire but functions to hold a loose fibrous material such as moss so that the wires of the frame or holder will be concealed. The frame is provided with a candle-holder preferably attached to the bottom of the moss-holder in such a way to conceal the candle-holder. The fibrous material enables the stems of the flowers to be readily stuck into it. Another example of a floral holder is disclosed in U.S. Pat. No. 2,876,587 issued Oct. 1, 1954 to David Saks, et al. The Saks patent discloses a candlestick flower arranger having the ability to be fitted over the candle and supported upon the holder with a separate grill or annular member to support and anchor the stems of the flowers.

In U.S. Pat. No. 2,686,989 issued Jul. 13, 1949 to Annie Lee Dillon, et al. another example of a floral holder is disclosed for candelabras. The Dillon patent discloses a floral holding device designed especially for use in connection with structure for supporting a candle with flowers, and decorative articles about the same. The Dillon floral holding device is in the form of on an annulus and adapted for use with a candelabra and decorative article holders so that the flower holder may be adjusted relative to its weight and proximity to which it is mounted but which may be placed in an ordinary bowl for supporting flowers therein. The annulus is preferably of a resilient material provided with a centrally located tapered support receiving opening and a plurality of spaced apertures of smaller diameter about the central opening for receiving and supporting the extremities of plant stems. The Dillon floral holder is of a construction to hold flowers with the stems submerged in water for extending their lives and which holder will not easily deteriorate on account of water exposure.

A further example of a candle mounted floral holder is disclosed in U.S. Pat. No. 2,929,171 issued Mar. 19, 1959 to Gilbert Josephson. The Josephson patent discloses a candle and flower arranger in which there is provided a flower supporting member which is of toroidal shape, and which is made of a tubular length of a spirally wound crimped wire inter-engaged at the opposite ends thereof to define said toroidal shaped flower supporting member. The Josephson flower arranger includes a housing member having inner and outer circumferential walls held in radially spaced relation by a bottom wall extending between the inner and outer walls at the bottom edges thereof. The inner wall defines an open ended tubular part for insertion of a candle therein, and the inner wall in conjunction with the outer wall defines a space in which the flower supporting member is removably disposed. Preferably, the candle and flower arranger of Dillon includes a flower supporting member of crimped wire construction, whereby flowers may simply and conveniently be supported thereby in the arranger. Preferably, the flower supporting member is a resilient toroidal shaped member.

Another example of a flower holder is disclosed in U.S. Pat. No. 3,303,610 issued Feb. 14, 1967 to Paul F. K. Erbguth. The Erbguth flower holder is constructed and arranged to serve as a candle holder for use in combination with a candle. The Erbguth flower holder is generally circular having a central opening extending therethrough and including a chamber for containing water. The Erbguth flower holder includes a case for holding water, an insert member having means for supporting flowers in a generally vertical position which means includes axially-spaced apertures for retaining flowers in a generally upright position and means for accommodating a candle. The insert member being supported in axially-spaced position from an open end of the case by circumferentially-space posts.

An yet another example, a floral bouquet and keepsake assembly is disclosed in U.S. Pat. No. 6,145,245 issued Nov. 14, 2000 to Bryan K. Honkawa, et al. The Honkawa patent discloses a universal floral bouquet which secures a keepsake to a floral bouquet arrangement. The Honkawa reference includes a container having an upright probe projecting vertically from the center of the container. Floral foam that receives a bouquet of flowers is pressed into and through the probe. A receptacle associated with the keepsake frictionally engages the opposite end of the probe to securely support the keepsake above the floral arrangement. The receptacle may be integral to the base of the keepsake or may be a component of a transition piece, called an intermediate support, upon which the keepsake, such as a cylindrical candle, is secured.

With regard to the aforementioned "church" type elongated candlestick, there has been found a need for an improved floral holder in order to extend the time period live cut floral members can maintain their "freshness" before wilting.

SUMMARY OF THE INVENTION

The present invention is in combination with an elongated candlestick which typically includes a base, an elongated support extending upwardly from said base, a cylindrical candle holder affixed to the elongated support at the upper end and in coaxial alignment with it, and an elongated candle supported by said candle holder and extending in an upwardly direction. The candlestick also includes a flat circular or dish-shaped member coaxially aligned with the candle holder and affixed to the elongated support at its upper end. The flat-circular or dish-shaped member has a diameter greater than the elongated support.

The improvement of the present invention includes an annular live floral holder that can be removably seated on the flat-circular or dish-shaped member. The annular live floral holder having a bottom and an inner and an outer wall of predetermined heights. The floral holder has a central circular opening of sufficient diameter in the bottom thereof to permit the candle holder to pass through it. A circular water-retaining trough is formed by the bottom and the inner wall and the outer wall of the floral holder. The circular water-retaining trough is in coaxial alignment with the central circular opening. At least one water retaining foam member is arranged within the water-retaining trough. The live cut floral members having stalks embedded in and supported by the at least one retaining foam member. The water-retaining trough carries water for wetting the at least one water retaining foam member. The foam member retaining apparatus includes foam engagement members rotatably securing the at least one foam member within the water-retaining trough.

The inner wall of the circular water-retaining trough preferably has a minimum diameter greater than the diameter of the central opening of the bottom of the floral holder. The floral holder desirably further includes a wax dripping containment portion. The wax dripping containment portion is formed on the outside of the inner wall of the water-retaining trough between the inner wall and the candle holder, whereby wax that may drip from the candle is prevented from entering the water-retaining trough of the bowl.

The foam engagement members of the foam member retaining apparatus desirably includes a plurality of adhesive-backed tape strips extending over the at least one foam member and affixed to the outside of the floral holder, whereby the at least one foam member remains secured within the trough even if the floral holder is inverted during transportation prior to being installed on the candlestick.

The foam engagement members of the foam member retaining apparatus preferably includes upwardly extending pin members attached to the bottom of the floral holder within the water-retaining trough in predetermined position. The foam members are operatively positioned to engage the pin members, whereby the foam members are pierced and securely engaged by the pin members in position even if the floral holder is inverted.

BRIEF DESCRIPTION OF THE DRAWINGS

For a better understanding of the invention, reference may be made to the accompanying drawings exemplary of the particular embodiments of the invention, where.

DETAILED DESCRIPTION OF THE PARTICULAR EMBODIMENTS

Figure 1:
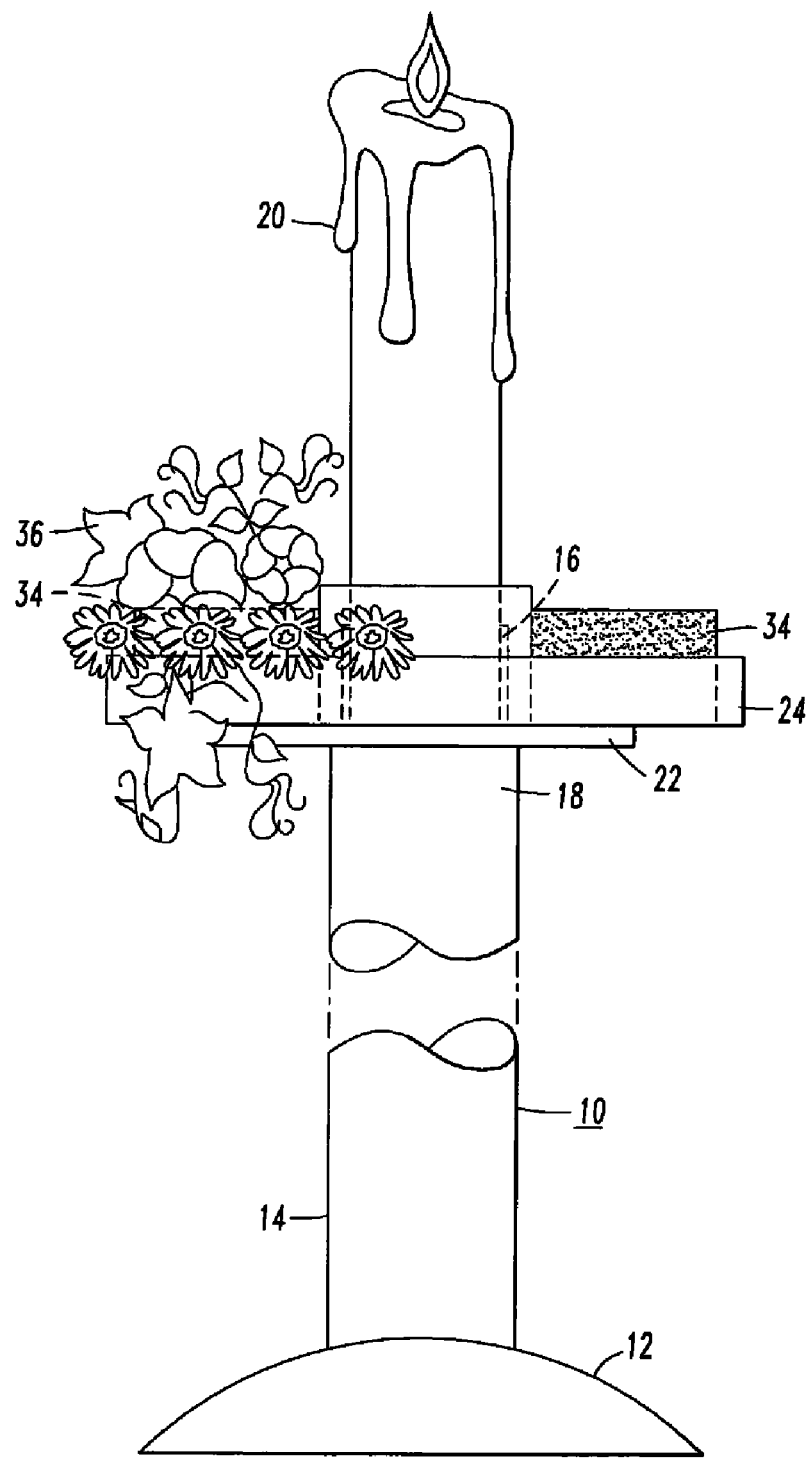
FIG. 1 is an elevation view of the candlestick with the annular live floral holder of the present invention mounted thereon.
Figure 2:
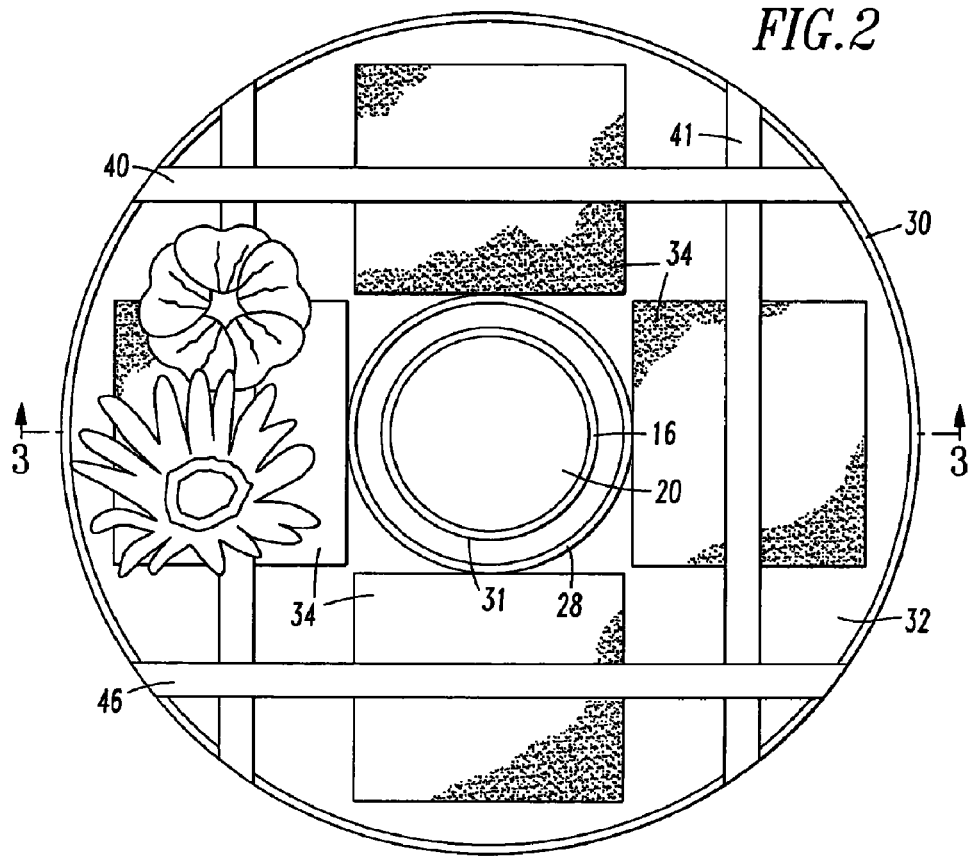
FIG. 2 is a plan view of the floral holder shown in FIG. 1.
Figure 3:
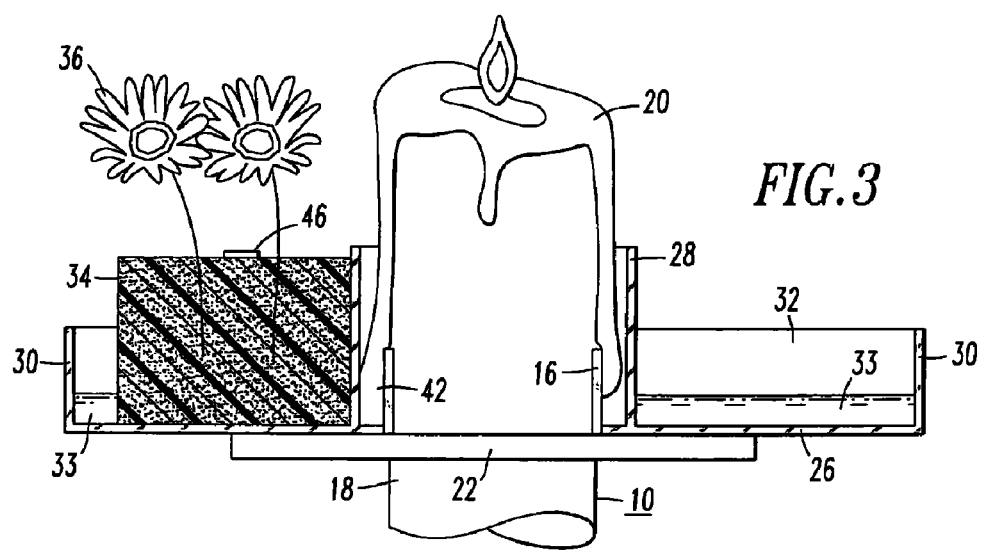
FIG. 3 is a cross-section elevation view taken along the line 3-3 shown in FIG. 2.

The present invention is provided in combination with an elongated candlestick 10 as shown in FIGS. 1-3. The candlestick 10 is of the type, as previously mentioned, in common use in churches, such as, catholic churches. The candlestick 10 includes a base 12 for supporting the candlestick 10 and an elongated, typically cylindrical, support 14 extending upwardly from the base 12. A cylindrical candle holder 16 is attached to the elongated support 14 at the upper end 18 of the support 14. An elongated candle 20 is supported by the candle holder 16 and extends upwardly from it. A flat-circular or dish-shaped member 22 is coaxially aligned with the candle holder 16 and attached to the cylindrical support 14 and has a diameter greater than the cylindrical holder 16. Typically, the candle 20 is sized so that the bottom of the candle fits snugly in the candle holder 16 for proper support. Such a cylindrical candle holder 16 may have a diameter of from about 1⅞ inches to 2 inches or more, for example. The height of the candle typically is from about 18 inches to 24 inches. Generally, the flat circular or dish-shaped member 20 is about 4 inches to 5 inches in diameter and often made of brass, while the diameter or thickness of the elongated support 14 is about 1.5 inches to 3.0 inches, for example. The height of the elongated support 14 is often 40 inches to 60 inches.

The improvement of the present invention provides an annular live floral holder 24 as shown in FIGS. 1-3. The floral holder 24 is removably seated on the flat-circular or dish-shaped member 22. The floral holder 24 is preferably made of plastic such as a clear or colored hard plastic, such as, No. 37 plastic sold by Syndicate Sales care of 2075 N. Wabash Street, Kokomo, Ind. 46901-2063. The floral holder 24 has a bottom 26, an annular inner wall 28 and an annular outer wall 30 of predetermined height. The bottom 26 and inner and outer annular walls may have a thickness of about 3/32 of an inch, for example, which provides flexibility and sufficient strength. The bottom 26 by way of example may have a diameter of 12 inches. The floral holder 24 has a central opening 31 of sufficient diameter in the bottom 26 thereof to permit the candle holder pass through it without much play. In another variety of candlestick instead of a tubular holder 24 a metal spike, not shown, may be used instead. In that case the central opening 31 should be of sufficient diameter to permit the base of the candle to pass through it. A circular water-retaining trough 32 is formed or defined by the bottom 26, the inner wall 28 and the outer wall 30 of the floral holder 24 or the candle itself. An at least one retaining foam member 34 is arranged with the water-retaining trough 32. Live cut floral members 36 have stalks 38 which are embedded in the foam members 34. The floral members 36 typically are cut flowers, ferns or other floral pieces. The stalks 38 of the floral members 36 are supported as desired by the foam members 34. The foam members maybe what is commonly known as "floral foam" and is in common use by florists in this country. A floral foam of this type is sold under a trademark OASIS by Smithers-Oasis, 919 Marvin Avenue, Kent, Ohio 44240. The floral foam retains moisture when wetted for a limited time due to evaporation and provides support for the floral members 36 when they are embedded in the foam. Water 33 is added to the water-retaining trough 32 trough preferably after the live floral holder 24 has been seated in position on the candlestick 10. The water contained in the trough 32 keeps the foam members 34 and therefore the floral members 36 moist to greatly extend their life compared to the prior art arrangement where the floral foam members were wetted, but were not placed in water in the holder. The inner wall 28 and the outer wall 30 should be of sufficient height maintain the desired level of water in the trough. The height of the inner wall 28 and the outer wall 30 may be 1.5 inches for example. The FIGS. 1, 3, 4, 5 and 6 show inner wall 28 being higher than the outer wall 30 for the reason hereinafter explained, but the walls 28, 30 may have an equal height if desired. A foam member retaining apparatus 40 is provided for holding the foam members 34 with the embedded stalks 38 of the live cut floral members 24 in the floral holder 28 especially during transportation from the florist to the church, for example. The foam member retaining apparatus 40 includes foam engagement members 41 to secure the at least one foam member 34 within the trough 32 from rotating or falling out of the trough.

Figure 4:
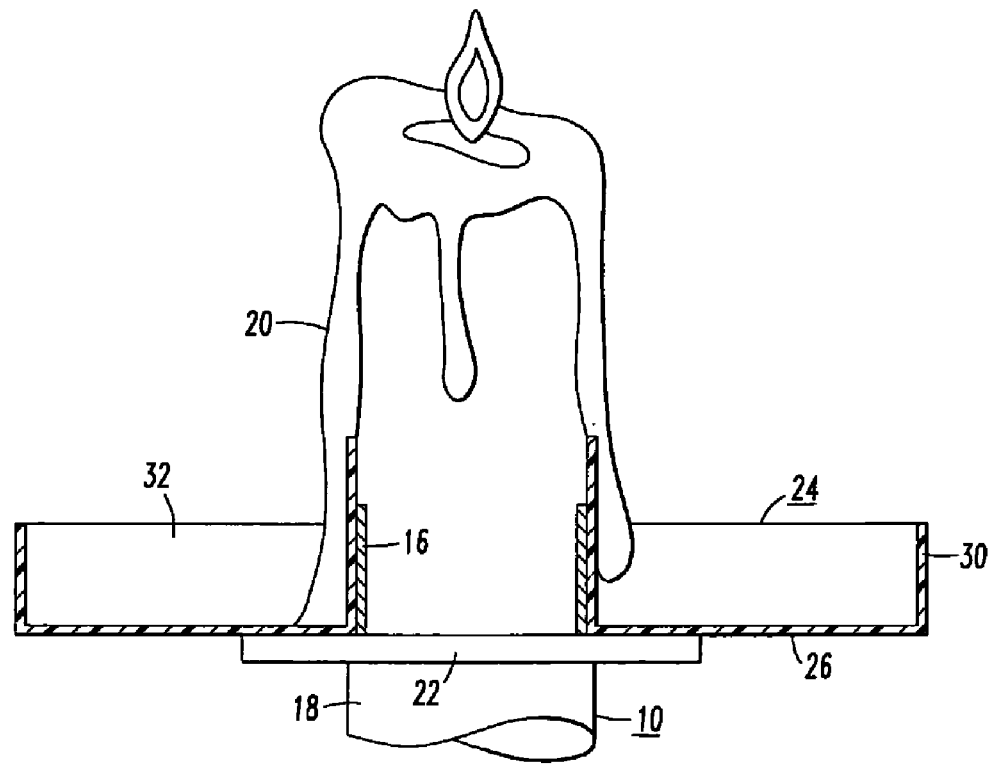
FIG. 4 is a partial sectional view showing an alternative candle holder of the present invention without the waxing dripping containment portion aspect, the foam members have been removed for clarity.
Figure 5:
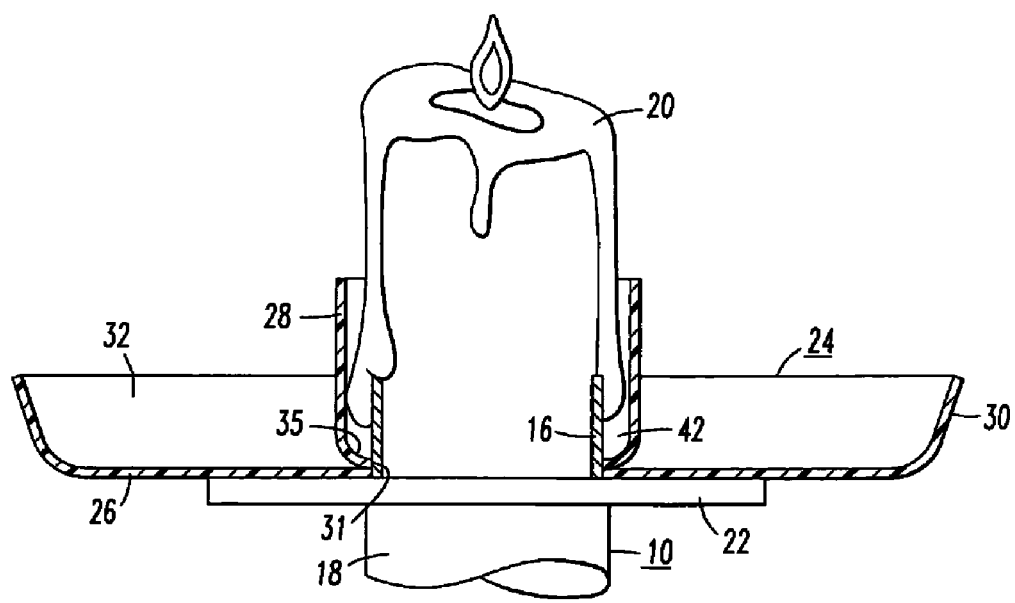
FIG. 5 is an elevation view of a variation of the floral holder shown if FIG. 3 with an inner wall 28 having a bottom portion 31 curved inwardly with a diameter equal to the central opening 31.

The inner wall 28 of the floral holder 24 preferably has a minimum mean diameter that is greater than the diameter of the central opening 30 of the bottom 26 of the floral holder 24. The floral holder 24 desirably includes a wax dripping containment portion 42 as shown in FIG. 3. The wax dripping containment portion 42 is formed between the outside 44 of the inner wall 28 of the floral holder 24 and the candle holder 16. The wax dripping containment portion may have an average width of ⅛ inch or greater. The height of the inner wall 28 can also be made higher than the outer wall 30 as desired to ensure that dripping wax is not deposited on the live floral members 36 supported in the foam members 34 which may possibly damage them and require unnecessary removal of wax from the foam members 34 and the interior of the trough 32. FIG. 4 depicts the present invention without the feature of the wax dripping containment portion 42. FIG. 5 shows a variation of the floral holder 24 with an inner wall 28 that has a bottom portion 35 curving axially inwardly to equal the diameter of the central opening 31. This variation provides a wax containment portion 42, but in addition may be somewhat easier to clean wax drippings from the curved bottom portion 35 of the inner wall 28.

Figure 6:
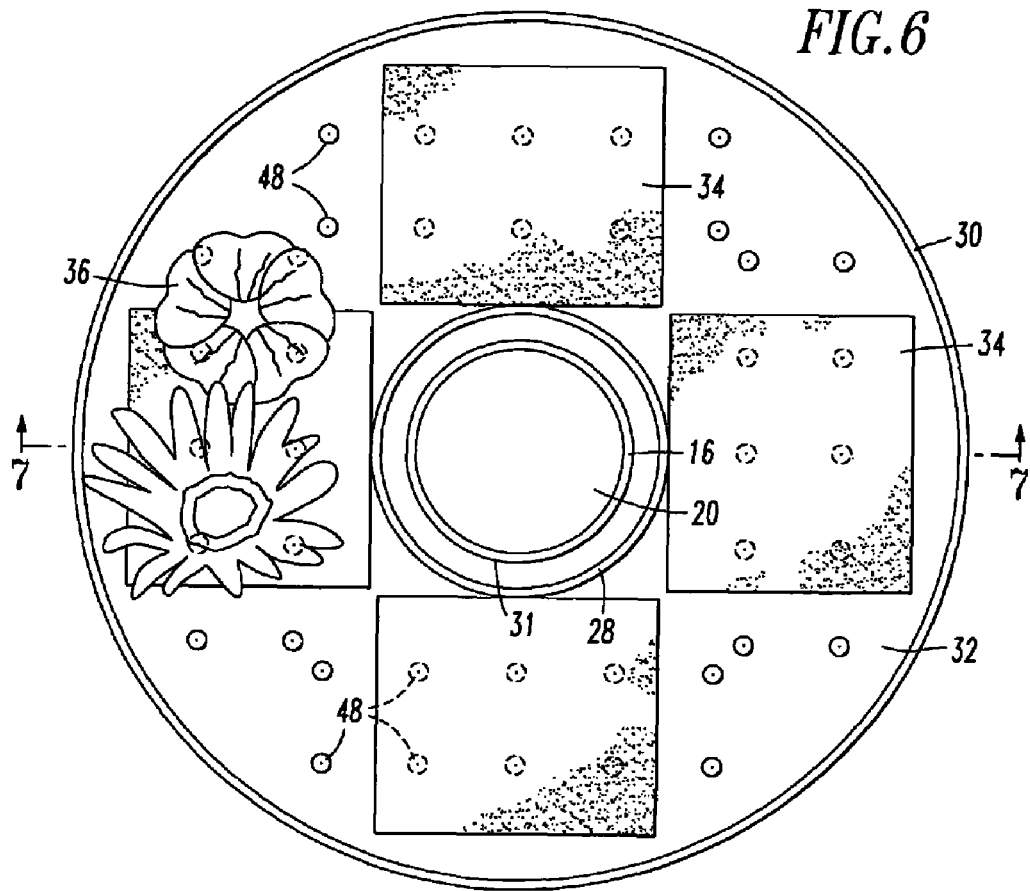
FIG. 6 is an alternative plan view of the present invention shown in FIG. 2 with the provision of upwardly extending pin members without the adhesive backed tape strips shown in FIG. 2; and, FIG. 7 is a cross-section elevation view taken along the line 7-7 shown in FIG. 6 but with one of the foam members removed for clarity.
Figure 7:
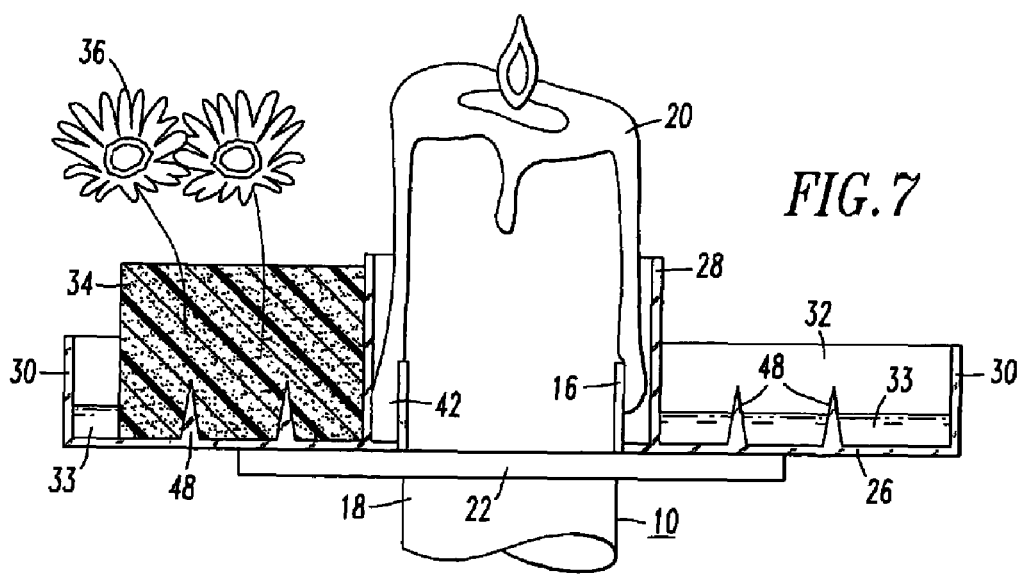

The foam engagement members 41 may comprise a number of adhesive-backed tape strips 46, as shown in FIGS. 2 and 3, extending over the foam members 34 an attached to the outside of the floral holder. The tape strips 46 retain the foam members 34 within the trough 32 even if the floral holder 31 is inverted. The tape strips 46 are a commonly used adhesive backed water proof tape sold for example by Oasis Floral Products, Smithers-Oasis USA, 919 Marvin Avenue, Kent, Ohio 44240. Alternatively, the foam engagement members 41 may instead include upwardly extending pin members 48 attached or integral with the bottom 26 of the floral holder 24 within the water-retaining trough 32 as shown in FIGS. 6 and 7. The foam members 34 may be pushed onto the pin members 48, resulting in the pin members 48 piercing the material of the foam members 34, thereby securing the foam members 34 on the pin members 48 even if the floral holder is inverted.

Although this invention has been disclosed in the context of certain preferred embodiments and examples, it will be understood by those skilled in the art that the present invention extends beyond the specifically disclosed embodiments to other alternative embodiments and/or uses of the invention and obvious modifications and equivalents thereof.

What is claimed is:

1. In combination with an elongated candlestick, said candlestick including a base, an elongated support extending upwardly from said base, a flat circular or dish-shaped member coaxially aligned with said elongated support and affixed to said elongated support at the upper end thereof, a cylindrical candle holder affixed to said flat circular or dish-shaped member and in coaxial alignment with said elongated support, an elongated candle supported by said candle holder and extending upwardly from said flat-circular or dish-shaped member, said flat circular or dish-shaped member having a diameter greater than said elongated support, the improvement which comprises:

an annular live floral holder removably seated on said flat circular or dish-shaped member, said annular live floral holder having a bottom and an annular inner and an annular outer wall of predetermined height, said floral holder having a central circular opening of sufficient diameter in said bottom to permit said candle holder to pass therethrough, a circular water-retaining trough formed by said bottom and said inner wall and said outer wall of said floral holder, said circular water-retaining trough in coaxial alignment with said central circular opening, at least one water retaining foam member arranged within said water-retaining trough, said live cut floral members having stalks embedded in and supported by said at least one retaining foam member, said water-retaining trough carrying water for wetting said at least one retaining foam member, a foam member retaining apparatus including foam engagement members rotatably securing said at least one foam member within said water-retaining trough, said inner wall of said floral holder has a bottom portion that curves axially inwardly, said inner wall of said floral holder has a minimum mean diameter greater than the diameter of the central opening of the bottom of the floral holder, said floral holder further comprising a wax dripping containment portion, said wax dripping containment portion formed floral holder between said inner wall of said floral holder and said cylindrical candle holder, said minimum mean diameter of inner wall of said floral holder providing a predetermined width of the wax dripping containment portion to prevent wax melting from the candle from entering the water-retaining trough, whereby wax that may drip from said candle is prevented from entering the water-retaining trough of said bowl.

2. The combination of claim 1, wherein the inner wall of said circular water-retaining trough has a minimum mean diameter greater than the diameter of the central opening of the bottom of the floral holder, said floral holder further comprising a wax dripping containment portion, said wax dripping containment portion formed on the outside of said inner wall of said water-retaining trough between said inner wall and said candle holder, whereby wax that may drip from said candle is prevented from entering the water-retaining trough of said bowl.

3. The combination of claim 1, wherein said foam engagement members of said foam member retaining apparatus comprises a plurality of adhesive-backed tape strips extending over said at least one foam member and affixed to the outside of said floral holder, whereby said at least one foam member remains secured with said trough even if the floral holder is inverted.

4. The combination of claim 1, wherein said foam engagement members of said foam member retaining apparatus comprises upwardly extending pin members affixed to said bottom of said floral holder within said water-retaining trough in predetermined position, said foam members operatively positioned to engage said pin members, whereby said foam members are pierced and securely engaged by said pin members in position even if the floral holder is inverted.

5. The combination of claim 1, wherein said inner wall of said floral holder has a height greater than said outer wall.

6. The combination of claim 2, wherein said inner wall of said floral holder has a bottom portion that curves axially inwardly.

* * * * *